United States Patent Office 3,037,232
Patented June 5, 1962

3,037,232
WINDSHIELD CLEARING SYSTEM
Leonard C. Neufeld and Alfred H. Schmalfeldt, Des Moines, Iowa, assignors to The Delman Company, Cookeville, Tenn., a corporation of Tennessee
Filed Mar. 21, 1960, Ser. No. 16,553
7 Claims. (Cl. 15—250.02)

This invention relates to windshield clearing systems and more particularly to a control device providing for the concurrent operation of the wiper and washer units and for operation of the wiper unit independently of the washer unit.

An object of this invention is to provide an improved windshield clearing system having a time delay operable to concurrently actuate the wiper unit with operation of the washer unit and to de-actuate the wiper unit subsequent to de-actuation of the washer unit.

A further object of this invention is to provide in a windshield clearing system utilizing an electrically operated wiper unit and a pump operated washer unit, electrically operated time delay means for concurrently actuating the pump and the wiper unit, and operable to de-actuate the pump operation and the wiper unit operation in a timed relationship.

Yet a further object of this invention is to provide a windshield clearing system having an electrically driven wiper unit and a washer unit operated by a combination drive and timing electric motor for delivering washing fluid under pressure, and means operated by the electric motor for sequentially halting the delivery of the washing fluid and stopping the operation of the wiper unit in a timed relation.

Still another object of this invention is to provide in a windshield clearing system with an electrically operated wiper unit, an electric motor actuated by an electric circuit provided therefor and operable through a clutch mechanism for driving a pump of a washer unit for delivering washing fluid under pressure, and wherein a mechanically movable time delay unit is driven off the electric motor for sequentially disengaging the clutch mechanism and operating a switch in the circuit for stopping the operation of both the wiper unit and the electric motor.

Another object of this invention is to provide a structural arrangement for obtaining the above mentioned objectives which is economical to manufacture, easy to install, and effective in service and operation.

These objects and other features and advantages of this invention will become apparent by reference to the following description when taken in conjunction with the accompanying drawings, wherein.

Figure 1:
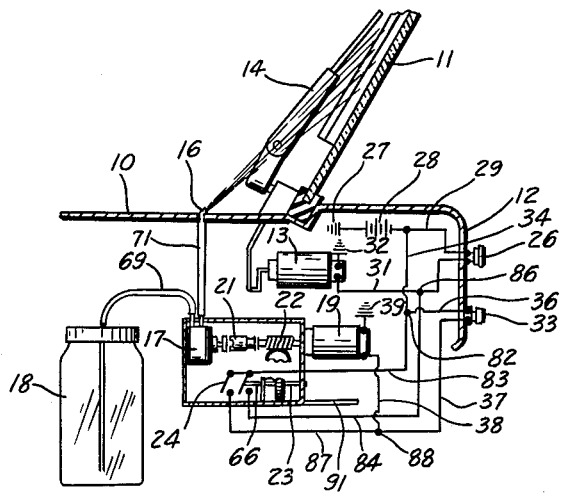
FIG. 1 is a schematic representation of a motor vehicle equipped with a windshield clearing system constructed in accordance with the present invention.

Referring now to the drawing, the cowl 10, windshield 11, and dashboard 12 of a motor vehicle are disclosed (FIG. 1). The system of this invention for clearing the windshield 11 includes a wiper unit having a wiper motor 13 for oscillating a wiper 14 across the windshield 11; a washer unit having a nozzle 16 for directing a stream of washing fluid against the windshield 11, a pump 17 for drawing the fluid from a reservoir 18 for delivering the fluid under pressure to the nozzle 16; and a timer unit including an electric timing motor 19 for controlling the operation of the wiper unit and the washer unit.

The electric timing motor 19 has the dual function of driving through a clutch mechanism 21 (FIGS. 1 and 2) the washer unit pump 17, and of driving through a gear reduction assembly 22 a shaft 23. As will be explained in detail hereinafter, rotation of the shaft 23 causes a simultaneous engagement of the clutch mechanism 21 and closing of an electric switch 24 (FIGS. 1 and 3) in a circuit for the motors 13 and 19, whereby the washer and wiper units are concurrently actuated for operation. Further rotation of the shaft 23 then effects first a disengagement of the clutch mechanism 21 and second an opening of the electric switch 24, whereby the washer unit and wiper unit are de-actuated in a timed sequence, along with a stopping of the timing motor 19 to halt the entire clearing system operation.

A shaft 41 (FIG. 2) is connected to the electric motor 19 and has a first clutch member 42 reciprocally mounted thereon and adapted for engagement with a second clutch member 43 fixed to the drive shaft 45 of the washer unit pump 17 which is of a usual gear type. A longitudinally extended slot 44 is formed in the first clutch member 42 and through which a pin 46 from the shaft 41 extends, thereby limiting the longitudinal movement of the first clutch member 42 on the shaft 41 to the length of the slot 44. The clutch members 42 and 43 are normally disengaged by virtue of the action of a yoke member 47 pivotally connected at 48 to a bracket 49 secured to the base 51 (FIG. 2) of a housing 52 for the timing mechanism. The lower end 53 of the yoke member 47 is engaged by a leaf spring 54 on the housing base 51 so as to be normally biased in a clockwise direction, as viewed in FIGS. 2 and 4, to maintain the member 42 in its disengaged position, also shown in FIG. 2.

Also secured to the shaft 41 for rotation therewith, is a worm 56 which is part of the gear reduction assembly 22. The worm 56 in turn drives a worm gear 57 carried on a shaft 58 rotatably mounted on the inside of the housing 52 and on which is also mounted a worm 59 that is in meshed engagement with a worm gear 61 mounted on the shaft 23. By virtue of this gear reduction assembly 22, a rotational speed of approximately 10,000 r.p.m. of the motor shaft 41 is reduced to a rotational speed of approximately 4 r.p.m. for the shaft 23. One end 62 of the shaft 23 is suitably supported on the wall 63 of the housing 52, and its other end carries a drum 66 having a radially extended cam member 64 for actuating the clutch unit 21. A radially extended pin 67 (FIG. 3) is carried on the drum 66 in an axially spaced relation with the cam member 64 and functions as an actuator for the switch 24.

The switch 24 (FIG. 3) includes a pair of parallel conductive leaf elements 73 and 74 tied together for common movement by a non-conductive plug 76. The element 73 has an extended upturned end 72 adapted to be engaged by the pin 66. Both leaf elements 73 and 74 have mounted thereon contacts 70 and 75, respectively, and are normally biased in a position where the contacts 70 and 75 respectively touch a pair of contacts 77 and 78 mounted on another pair of parallel conductive leaf elements 79 and 81, respectively.

During the time the cam 64 is not engaged with bias member 47 whereby the pump 17 is not operating, the pin 67 (FIG. 3) is in engagement with the upturned end 72 of a leaf element 73 of the electric switch 24 sufficiently to force the element 73 to a position spaced between the other elements 79 and 81. Thus, the contacts 70 and 75 of the elements 73 and 74 are not in engagement with their respective contacts 77 and 78 of the pair of leaf elements 79 and 81. This arrangement provides that while the pump 17 is not operating, the switch 24 (FIG. 1) is open so that current is not being directed to the wiper motor 13.

To operate the wiper unit alone, a switch 26 (FIG. 1) on the dashboard 12 is depressed, thereby closing an electric circuit from a ground 27, through a battery 28, a conduit 29, the switch 26, another conduit 31, and across the wiper motor 13 to another ground 32. The wiper 14 will then oscillate until the switch 26 is again depressed to open the circuit.

To operate the wiper unit and the washer unit concurrently, another switch 33 on the dashboard 12 is momentarily depressed and then released. When the switch 33 is momentarily depressed, current is directed from the battery 28 through a pair of leads 34 and 36 to the switch 33, and then through another pair of leads 37 and 38 to the electric timing motor 19 and to a ground 39. Operation of the motor 19 transmits drive from the motor shaft 41 through the gear reduction assembly 22 to the shaft 23.

Figure 2:
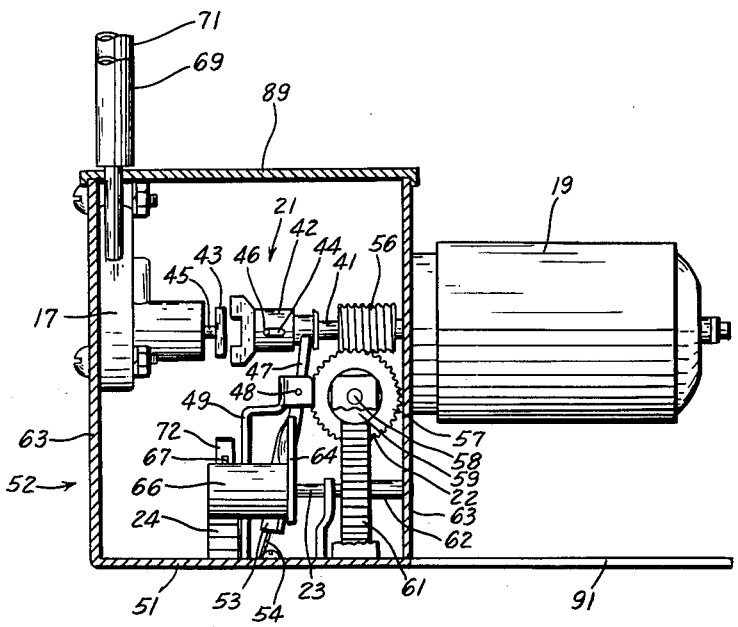
FIG. 2 is an enlarged side elevational view of the combination pump driving and timing mechanism for the windshield clearing system.
Figures 3, 4, 5:
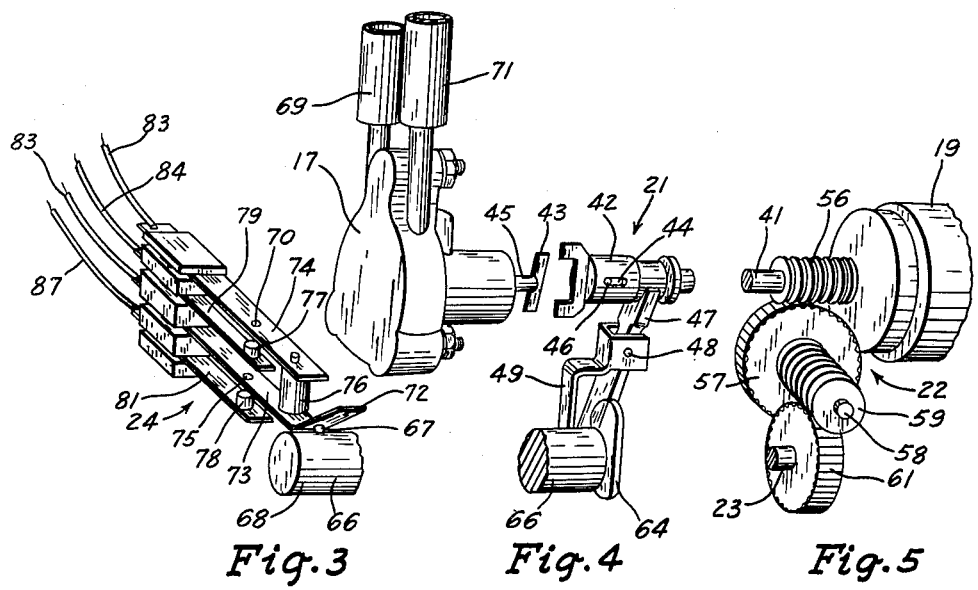
FIGS. 3, 4 and 5 are enlarged detail perspective views of component parts of the timing mechanism of FIG. 2.

Upon rotation of the shaft 23, it will be seen by referring to FIG. 4, that the cam 64 engages and moves the yoke member 47 in a counter-clockwise direction about the pivot 48, as viewed in FIGS. 2 and 4, against the action of the spring 54. This movement of the yoke member 47 moves the first clutch member 42 into an interlocking engagement with the second clutch member 43 to connect the washer unit pump 17 in a driven relation with the electric motor shaft 41. The pump 17 then operates to draw washing fluid from the reservoir 18 through a fluid transmitting line 69 (FIG. 1) for delivery under pressure through another line 71 to the nozzle 16.

Simultaneous with engagement of the cam 64 with the yoke member 47 to begin operation of the pump 17, the pin 67 rotates out of engagement with the upturned end 72, whereby the normal bias of the first pair of leaf elements 73 and 74 causes them to move to a position where their contacts 70 and 75 engage with the contacts 77 and 78 so as to close the switch 24. Thus, current is then directed from the battery 28 through the lead 34 (FIG. 1), a junction 82 and another lead 83 to the switch 24. From the upper engaging contacts 70 and 77 (FIG. 3) current is directed through a lead 84 to a junction 86 (FIG. 1) and then through the lead 31 to the wiper motor 13. From the lower two engaged pairs of contacts 75 and 78 (FIG. 3), current is directed through another lead 87 through a junction 88 and a lead 38 and across the electric timing motor 19 (FIG. 1). Therefore, a momentary closing of the switch 33 (FIG. 1) operates the electric motor 19 sufficiently to rotate the shaft 23 via the gear reduction assembly 22 whereby to engage the clutch mechanism 21 and to close the electric switch 24 so as to cause a concurrent operation of the washer unit pump 17 and the wiper unit motor 13 for simultaneous operation of both the washer and wiper units.

This concurrent operation of both the washer and wiper units continues during a partial rotation of the shaft 23, until the cam 64 (FIG. 4) moves out of engagement with the yoke member 47 whereby the leaf spring 54 (FIG. 2) moves the member 47 in a clockwise direction to disengage the clutch members 42 and 43, thus stopping the operation of the washer unit pump 17 to halt the delivery of fluid to the nozzle 16. Subsequent in time to the movement of the cam 64 away from the yoke member 47, the pin 67 (FIG. 3) again engages the upturned end 72 of the switch element 73, to move the interconnected elements 73 and 74 upwardly, as viewed in FIG. 3, out of contact engagement with the other pair of switch elements 79 and 81. This movement of the pin 67 opens the switch 24 (FIG. 1) and the circuit therefor whereby to cause a simultaneous stopping of both the wiper motor 13 and the electric motor 19 so as to halt the entire operation of the windshield clearing system. Thus at the end of the windshield clearing operation, the switch 33 is open and the switch 24 is also open, therefore requiring a depressing of the switch 33 to again start the cycle of a combined wiper and washer windshield clearing operation.

Figure 6:
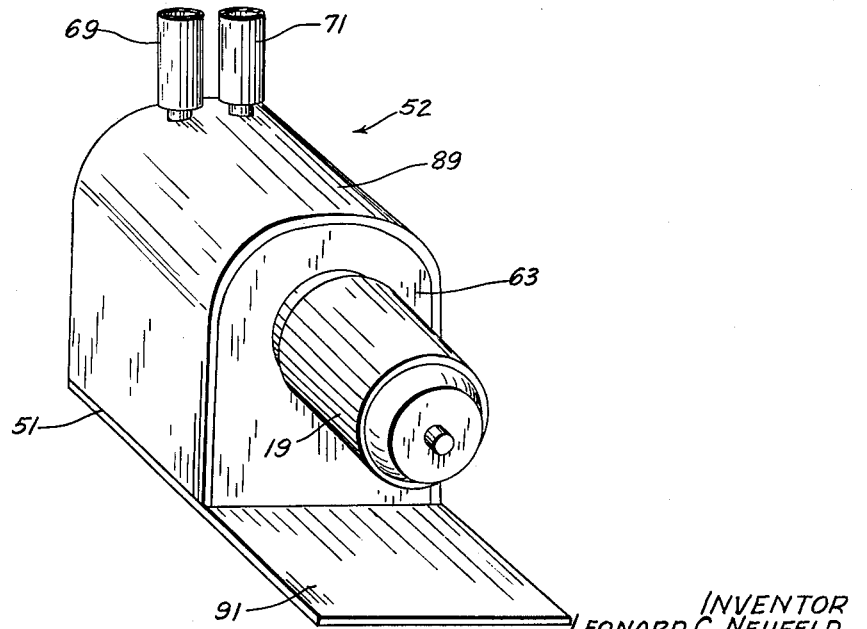
FIG. 6 is an enlarged perspective view of the housing for the mechanism of FIG. 2.

As mentioned hereinbefore, a housing 52 (FIGS. 2 and 6) is provided for the time delay mechanism. The housing 52 includes the base 51 and upstanding end walls 63. It is noted that the pump 17 (FIG. 2) is mounted on the inside of one end wall 63, and that the electric motor 19 is mounted on the outside of the other end wall 63. To cover those parts between the end walls 63, an inverted U-shaped cover 89 is set down over the base 51 and with the ends thereof in complementary engagement with the end walls 63. A mounting flange 91 is provided integral with the base 51 for mounting the housing 52 within the vehicle engine compartment beneath the hood 10.

Although a preferred embodiment of this invention has been disclosed herein, it is to be remembered that various modifications and alterations may be made without departing from the full scope of the invention as defined by the appended claims.

I claim:

1. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric combination timing and drive motor for driving said pump, an electric circuit for actuating said timing motor, first means operated by said timing motor for controlling the operation of said wiper motor, and second means operated by said timing motor and operatively connected to the driving connection between said timing motor and said pump for controlling the delivery of washing fluid from said pump in a timed relation with the operation of said wiper motor.

2. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for actuating said electric motor, means connected to said electric motor for operating said fluid pump, switch means in said circuit for controlling the operation of said wiper motor, and means driven by said electric motor engageable with both said connecting means and said switch means for regulating the delivery of fluid from said pump relative to the operation of said wiper motor.

3. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for actuating said electric motor, means for releasably connecting said electric motor in a drive relation with said pump, switch means in said circuit for controlling the operation of said wiper motor, and means driven from said electric motor engageable with both said connecting means and said switch means for sequentially connecting said pump with said electric motor and starting said wiper motor, and then stopping the operation of said pump prior to arresting the operation of said wiper motor.

4. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for actuating said electric motor, a clutch mechanism for releasably connecting said electric motor to said pump, pivotally mounted means operatively engageable with said clutch mechanism for normally maintaining said clutch mechanism in a released position, switch means in said circuit for starting and stopping said wiper motor, and actuating means driven from said electric motor including a first member engageable with said pivotally mounted means for moving said clutch mechanism into a connected position for a first certain time, and said actuating means having a second member for regulating said switch means to operate said wiper motor for a second certain time longer than said first certain time.

5. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for actuating said electric motor, clutch means for transmitting drive from said electric motor to said pump, bias means for normally maintaining such clutch means disengaged, switch means in said circuit for starting and stopping said wiper motor, speed reduction means driven off said electric motor, and a shaft rotatably driven off said speed reduction means and having a first member and a second member mounted thereon for independent coaction with said bias means and said switch means, respectively, whereby to vary the operation of said pump for delivering fluid relative to the operation of said wiper motor for oscillating said wiper.

6. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for actuating said electric motor, clutch means for transmitting drive from said electric motor to said pump, bias means for normally maintaining said clutch means disengaged, switch means in said circuit for starting and stopping said wiper motor, time delay means including a speed reduction unit driven off said electric motor, and a shaft rotatably driven off said speed reduction unit, a cam mounted on said shaft for engagement with said bias means for engaging said clutch means whereby to operate said pump for a predetermined time period, and a projection mounted on said shaft for engagement with said switch means for connecting said wiper motor into said circuit for a time period greater than said predetermined time period.

7. A vehicle windshield clearing system which comprises, a wiper motor for oscillating a wiper across a windshield to be cleaned, a nozzle for directing a stream of washing fluid against the windshield, means including a pump for delivering the fluid under pressure to said nozzle, an electric motor, an electric circuit for said motors, a first switch for momentarily energizing said electric motor, normally disengaged clutch means for transmitting drive from said electric motor to said pump, a second switch in said circuit operable in one position to energize said wiper motor and to maintain said electric motor energized after said momentary energization, time delay means including a rotatable member driven by said electric motor and, up partial rotation, selectively engageable with said clutch means and said second switch for engaging said clutch means and moving said second switch into said one position for effecting a concurrent operation of said wiper motor and said pump, said rotatable member, upon further partial rotation, selectively disengageable with said clutch means and said second switch for effecting a relatively timed disengagement of said clutch means and a movement of said second switch to a second position for de-energizing said electric motor.

References Cited in the file of this patent
UNITED STATES PATENTS
2,877,485    Oishei _____ Mar. 17, 1959
FOREIGN PATENTS
1,189,759    France _____ Mar. 23, 1959